United States Patent
Samejima (10) Patent No.: US 10,569,161 B2
(45) Date of Patent: Feb. 25, 2020

(54) OPERATION INFORMATION MEASUREMENT APPARATUS, FUNCTION CONTROL METHOD, AND PROGRAM

(71) Applicant: OMRON HEALTHCARE CO., LTD., Muko-shi, Kyoto (JP)

(72) Inventor: Mitsuru Samejima, Kyoto (JP)

(73) Assignee: OMRON HEALTHCARE CO., LTD., Muko-shi (JP)

( * ) Notice: Subject to any disclaimer, the term of this patent is extended or adjusted under 35 U.S.C. 154(b) by 407 days.

(21) Appl. No.: 15/417,722

(22) Filed: Jan. 27, 2017

(65) Prior Publication Data

US 2017/0128829 A1 May 11, 2017

Related U.S. Application Data

(63) Continuation of application No. PCT/JP2015/073440, filed on Aug. 20, 2015.

(30) Foreign Application Priority Data

Aug. 29, 2014 (JP) .................................. 2014-175838

(51) Int. Cl.
*A63F 13/235* (2014.01)
*H04M 1/725* (2006.01)
(Continued)

(52) U.S. Cl.
CPC .......... *A63F 13/235* (2014.09); *A63F 13/211* (2014.09); *A63F 13/212* (2014.09);
(Continued)

(58) Field of Classification Search
None
See application file for complete search history.

(56) References Cited

U.S. PATENT DOCUMENTS

| 2011/0009194 A1 | 1/2011 | Gabai et al. |
| 2013/0117693 A1 | 5/2013 | Anderson et al. |
| 2013/0159942 A1 | 6/2013 | Mizunuma et al. |

FOREIGN PATENT DOCUMENTS

| JP | 2005-286809 A | 10/2005 |
| JP | 2010-097340 A | 4/2010 |

(Continued)

OTHER PUBLICATIONS

Mar. 2, 2017 Preliminary Report on Patentability issued in International Patent Application No. PCT/JP2015/073440.

(Continued)

*Primary Examiner* — Kevin Y Kim
(74) *Attorney, Agent, or Firm* — Oliff PLC (57) ABSTRACT

An operation information measurement apparatus having a detection unit that detects information corresponding to a motion of a user includes: an operation information measurement unit that measures operation information of a user based on the information detected by the detection unit; a communication unit for performing near-field wireless communication with another apparatus; and a control unit that judges whether or not a first operation based on the detection information detected at a certain time by the detection unit of the operation information measurement apparatus matches a second operation based on detection information of a detection unit received from the other apparatus via the communication unit in a period from the certain time to a time when an amount of time corresponding to a first threshold elapses, and based on the result of that judgment, the control unit determines whether or not to output a command signal to the control unit.

9 Claims, 5 Drawing Sheets

(51) Int. Cl.
*G06F 1/16* (2006.01)
*A63F 13/211* (2014.01)
*A63F 13/212* (2014.01)
*A63F 13/352* (2014.01)
*A63F 13/69* (2014.01)
*G06F 3/01* (2006.01)
*H04M 1/67* (2006.01)

(52) U.S. Cl.
CPC ............ *A63F 13/352* (2014.09); *A63F 13/69* (2014.09); *G06F 1/163* (2013.01); *G06F 1/1694* (2013.01); *G06F 3/017* (2013.01); *H04M 1/72569* (2013.01); *H04M 1/67* (2013.01)

(56) References Cited

FOREIGN PATENT DOCUMENTS

| | | |
|---|---|---|
| JP | 2012-123608 A | 6/2012 |
| JP | 2013-132420 A | 7/2013 |
| JP | 2014-092987 A | 5/2014 |
| WO | 2009/072126 A2 | 6/2009 |

OTHER PUBLICATIONS

Oct. 27, 2015 Search Report issued in International Patent Application No. PCT/JP2015/073440.
Jun. 26, 2018 Office Action issued in Japanese Patent Application No. 2014-175838.
May 22, 2019 Office Action issued in German Patent Application No. 112015003954.6.

OPERATION INFORMATION MEASUREMENT APPARATUS, FUNCTION CONTROL METHOD, AND PROGRAM

TECHNICAL FIELD

The present invention relates to an operation information measurement apparatus, a function control method, and a program.

BACKGROUND ART

In recent years, apparatuses that can identify an action of a person (information indicating an operation state of a person, such as walking, running, going up or down stairs, or sleeping) or measure an activity amount (information indicating the amount of a person's activity, such as number of steps, walking distance, or expended calories) by using a motion detecting sensor that detects bodily motion, such as an acceleration sensor or an angular velocity sensor, have been actively developed. In the present specification, information on an action type and an activity amount is collectively referred to as operation information.

Patent Literature 1 discloses a mobile telephone that has a function of recognizing a specific gesture performed by a user using such a motion detection sensor and outputting a command corresponding to the gesture (a command to transition to voicemail response or e-mail reception).

Also, Patent Literature 2 discloses a watch that can receive and display data from a heart rate meter, according to which power conservation is achieved by starting the reception of data from the heart rate meter when an orientation sensed by a motion detection sensor is a specific orientation.

CITATION LIST

Patent Literature

Patent Literature 1: JP 2005-286809A
Patent Literature 2: JP 2013432420A

SUMMARY OF INVENTION

Technical Problem

As disclosed in Patent Literature 1 and 2, there are techniques according to which a specific operation can be started by a motion of a person wearing a device. With these techniques, the start of the specific operation is controlled by the motion of one apparatus. For this reason, there is a possibility that the specific operation will be started unintentionally by the user.

For example, the unlocking of an electronic device is envisioned as the specific operation. In this case, a person who has not been given permission to use the electronic device can perform unlocking by imitating the action of a person who has been given permission to use the electronic device, which reduces the security of the electronic device. Also, in the case where it is envisioned that transmission and reception of specific information to and from another apparatus is started by performing the specific gesture, there is a possibility that a state will be entered in which transmission and reception of the specific information with an unintended partner can be started, which reduces security.

The present invention has been made in view of the foregoing circumstances, and it is an object thereof to provide an operation information measurement apparatus, a function control method, and a program, according to which execution of a target specific function can be reliably controlled.

Solution to the Problem

The operation information measurement apparatus according to the present invention is an operation information measurement apparatus having a detection unit configured to detect information corresponding to a motion of a user, including: an operation information measurement unit configured to measure operation information of a user based on the information detected by the detection unit; a communication unit for performing near-field wireless communication with another operation information measurement apparatus having a said detection unit and a said operation information measurement unit; an operation matching judgment unit configured to judge whether or not a first operation based on detection information detected at a certain time by the detection unit of the operation information measurement apparatus matches a second operation based on detection information of the detection unit received from the other operation information measurement apparatus via the communication unit in a period from the certain time to a time when an amount of time corresponding to a first threshold value elapses; and a command signal output determination unit configured to, based on a result of the judgment performed by the operation matching judgment unit, determine whether or not a command signal is to be output to an execution unit configured to execute a specific function when the command signal is input.

The function control method of the present invention is a function control method for an operation information measurement apparatus having a detection unit configured to detect information corresponding to a motion of a user, an operation information measurement unit configured to measure operation information of the user based on information detected by the detection unit, and a communication unit for performing near-field wireless communication with another operation information measurement apparatus having a said detection unit and a said operation information measurement unit, the method including: an operation matching judgment step of judging whether or not a first operation based on detection information detected at a certain time by the detection unit of the operation information measurement apparatus matches a second operation based on detection information of the detection unit received from the other operation information measurement apparatus via the communication unit in a period from the certain time to a time when an amount of time corresponding to a first threshold value elapses; and a command signal output determination step of, based on a result of the judgment performed in the operation matching judgment step, determining whether or not the command signal is to be output to an execution unit configured to execute a specific function when the command signal is input.

The program of the present invention is a program for causing a computer to function as the operation information measurement unit, the operation matching judgment unit, and the command signal output determination unit in the operation information measurement apparatus. The program of the present invention is a program for causing a computer to function as the execution unit.

Advantageous Effects of Invention

According to the present invention, it is possible to provide an operation information measurement apparatus, a function control method, and a program, according to which execution of a target specific function can be reliably controlled.

DESCRIPTION OF EMBODIMENTS

Hereinafter, an embodiment of the present invention will be described with reference to the drawings.

Figure 1:
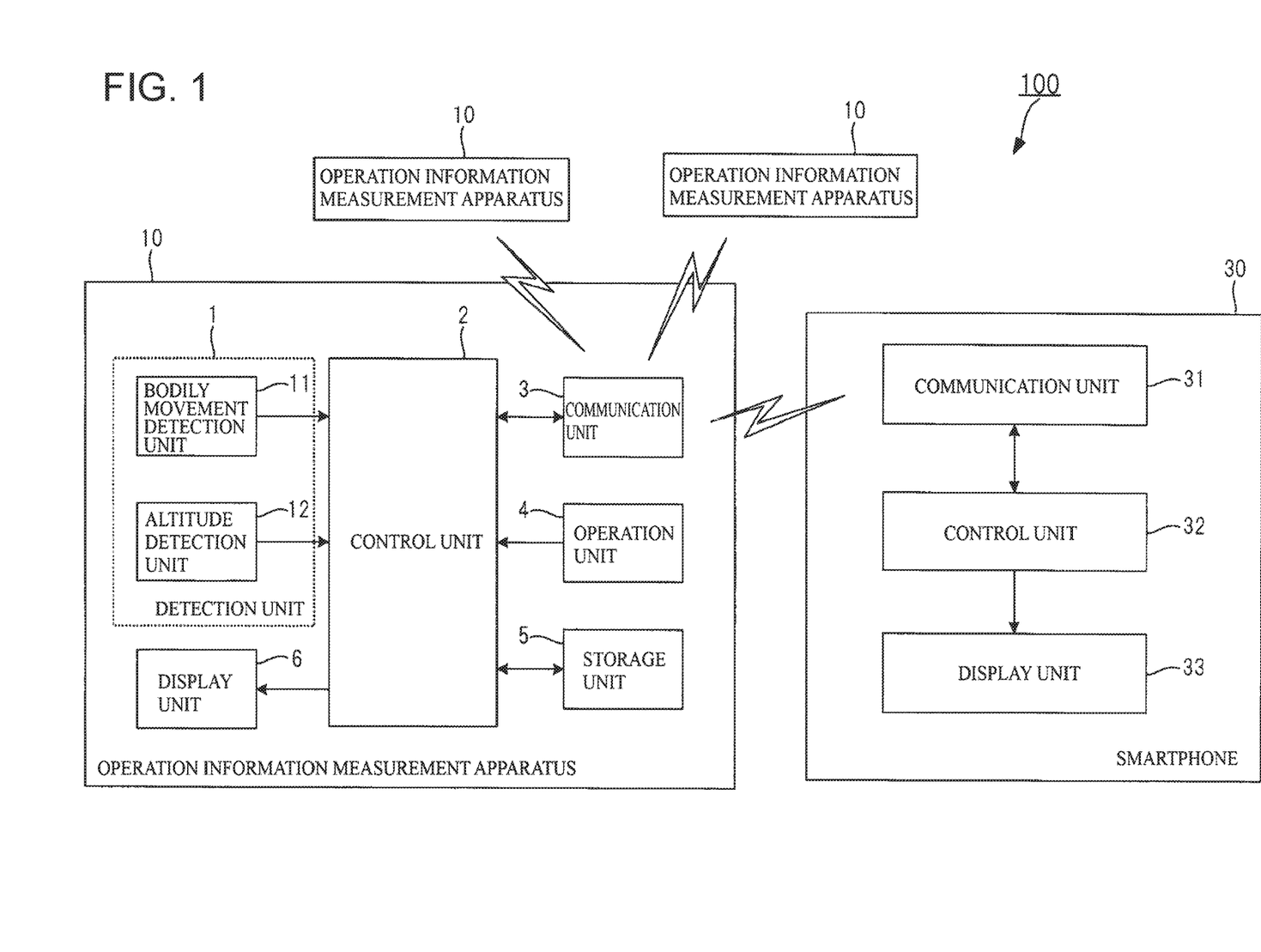
FIG. 1 is a diagram showing an overall configuration of a system 100 for describing an embodiment of the present invention.

FIG. 1 is a diagram showing an overall configuration of a system 100 for describing an embodiment of the present invention. The system 100 includes multiple (three, in the example shown in FIG. 1) operation information measurement apparatuses 10, and a smartphone 30 serving as an electronic device that can communicate with the operation information measurement apparatuses 10. The operation information measurement apparatuses 10 are each used while worn on the body of a user, and pedometers and activity meters are specific examples thereof.

In the system 100, any one of the multiple operation information measurement apparatuses 10 becomes a hub to communicate with the smartphone 30, and this hub communicates with another operation information measurement apparatus 10 (hereinafter also referred to as "other apparatus 10") that is not a hub.

Each operation information measurement apparatus 10 includes a detection unit 1, a control unit 2 that performs overall control of the entire apparatus, a communication unit 3, an operation unit 4, a storage unit 5 including a storage medium such as a flash memory or a ROM (Read Only Memory), and a display unit 6 for displaying various types of information.

The detection unit 1 detects information corresponding to the motion of a site on the body of the user on which the operation information measurement apparatus 10 is worn, and includes a bodily movement detection unit 11 and an altitude detection unit 12.

The bodily movement detection unit 11 detects the motion (acceleration, angular velocity, etc.) of the site on the body of the user on which the operation information measurement apparatus 10 is worn, and includes various motion sensors such as an acceleration sensor and an angular velocity sensor, and a signal processing unit that processes signals output from the various motion sensors. The bodily movement detection unit 11 need only include at least one motion sensor and a signal processing unit that processes a signal from that motion sensor.

The altitude detection unit 12 includes an air pressure sensor, and processes a detection signal from the air pressure sensor to detect the altitude of the site on which the operation information measurement apparatus 10 is worn. Note that the altitude detection unit 12 may be omitted. The altitude of the site on which the operation information measurement apparatus 10 is worn changes due to the movement of the user (e.g., going up or down stairs). Accordingly, the information on the altitude is also information corresponding to the motion of the site on which the operation information measurement apparatus 10 is worn.

The control unit 2 is mainly constituted by a processor that executes an apparatus program stored in the ROM of the storage unit 5.

The communication unit 3 is an interface for performing near-field wireless communication with other electronic devices, including the smartphone 30 and another apparatus 10. Near-field wireless communication refers to performing direct transmission and reception of information between apparatuses without the use of a network such as the Internet.

A communication interface conforming to ANT, a communication interface conforming to WIFI, a communication interface conforming to Bluetooth, or the like is used as such an interface. Note that communication between the operation information measurement apparatus 10 and the smartphone 30 may be performed using communication via a network such as the Internet.

The operation unit 4 is a device for inputting various types of instructions to the control unit 2, and is constituted by buttons, a touch panel mounted on the display unit 6, and the like.

The smartphone 30 includes a communication unit 31, a control unit 32, and a display unit 33.

The communication unit 31 is an interface for communicating with the communication unit 3 of the operation information measurement apparatus 10.

The control unit 32 is constituted by a processor with a built-in memory. A game program is stored in the memory. The processor executes the game program to cause a game screen to be displayed on the display unit 33, whereby an electronic game that can be played on the game screen is provided. Also, the control unit 32 functions as an execution unit by executing the game program.

Although the electronic game provided in the present embodiment is a game of battling with an enemy character, this is an example, and there is no limitation thereto.

In accordance with command signals transferred from the operation information measurement apparatuses 10 via the communication unit 31, the control unit 32 controls an attack parameter for attacking an enemy character in the electronic game based on the game program. The attack parameter determines the amount of damage that can be inflicted on the enemy character.

When no command signal has been received from the operation information measurement apparatuses 10, the control unit 32 sets the attack parameter to a reference value. On the other hand, when a command signal is received from the operation information measurement apparatus 10, the control unit 32 sets the attack parameter to a value larger than the reference value, in accordance with the command signal.

Figure 2:
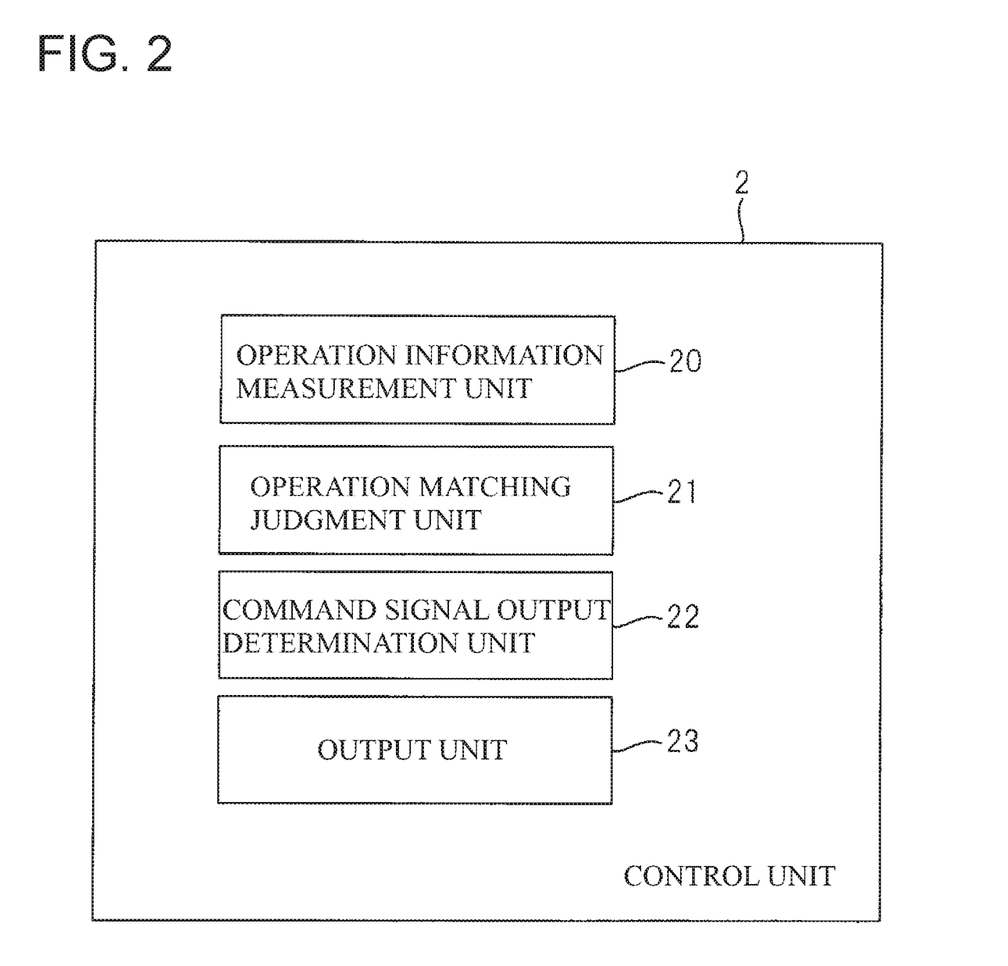
FIG. 2 is a diagram showing functional blocks realized by a control unit 2 due to a processor executing an apparatus program stored in a storage unit 5 of an operation information measurement apparatus 10 shown in FIG. 1.

FIG. 2 is a diagram showing functional blocks realized by the control unit 2 due to a processor executing an apparatus program stored in a storage unit 5 of an operation information measurement apparatus 10 shown in FIG. 1.

As shown in FIG. 2, the control unit 2 includes an operation information measurement unit 20, an operation matching judgment unit 21, a command signal output determination unit 22, and an output unit 23.

The operation information measurement unit 20 measures the operation information of the user based on the detection information detected by the detection unit 1. The operation information includes at least one of the action type and the activity amount of the user.

In the present specification, the action type refers to an operation state of a person, such as walking, running, sitting, standing, going up or down stairs, sleeping, studying, or eating. For example, going up or down stairs can be identified by a change in the altitude information detected by the altitude detection unit 12. States such as walking, running, sitting, standing, and sleeping can be identified using information detected by the bodily movement detection unit 11, for example.

The operation matching judgment unit 21 judges whether or not a first operation based on detection information detected at a certain time by the detection unit 1 of the apparatus matches a second operation based on the detection information of the detection unit 1, which is received from the other apparatus 10 via the communication unit 3 in a period from the certain time to a time when an amount of time corresponding to a first threshold value α elapses. The first threshold value α is a value that is set with consideration given to a time lag that occurs during transmission and reception of the detection information between the operation information measurement apparatuses 10.

For example, detection information (operation waveform data) corresponding to a predetermined operation (e.g., in the case where the operation information measurement apparatus 10 is worn on a hand, an operation of punching once with the hand on which the operation information measurement apparatus 10 is worn) is registered in the storage unit 5.

Figure 3:
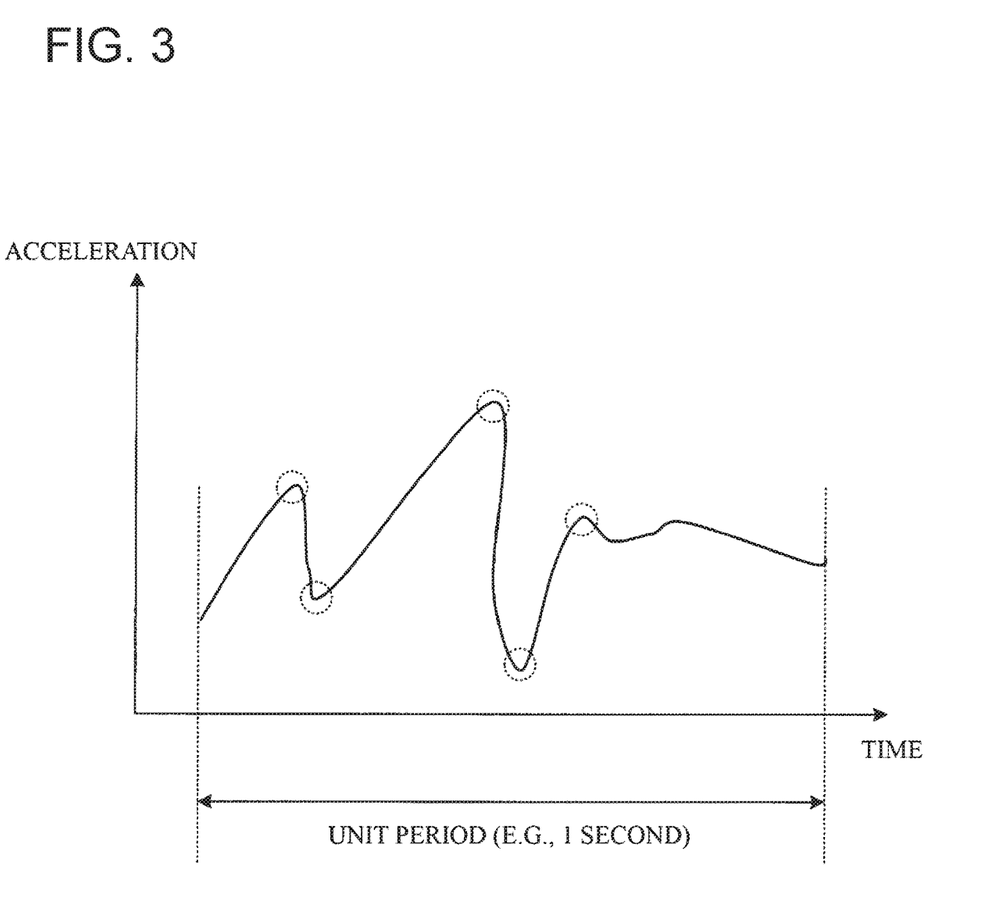
FIG. 3 is a diagram showing an example of detection information (acceleration signal waveform) detected by a detection unit 1 when a specific operation is performed.

Specifically, when an operation of punching is performed in a state in which the user is wearing the operation information measurement apparatus 10 on a hand, signals (acceleration signal and angular velocity signal) corresponding to the operation are detected by the detection unit 1, as shown in FIG. 3.

The control unit 2 of the operation information measurement apparatus 10 stores the operation waveform data in a unit period (e.g., 1 second) shown in FIG. 3 in the storage unit 5 in association with identification information indicating a certain operation, and ends the registration task. Multiple types of the operation waveform data can also be registered. Here, the operation waveform data is registered as the actual measured data of the user, but predetermined data may also be registered at the time of shipping the operation information measurement apparatus 10 as the operation waveform data.

If the detection information (operation waveform data) detected by the detection unit 1 matches the operation waveform data registered in the storage unit 5, the operation matching judgment unit 21 detects that a registered operation indicated by the identification information of the operation waveform data has been performed by the user. If it is detected that a registered operation has been performed, the operation matching judgment unit 21 stores the detection time in the storage unit 5 in association with the identification information.

The actually-detected operation waveform data matching the registered operation waveform data is not limited to the ease where the two pieces of operation waveform data match completely. For example, when multiple feature points (points circled by dotted lines in FIG. 3, at which the acceleration (or angular velocity) changes to the opposite direction) extracted from the registered operation waveform data and feature points extracted from the actually-detected operation waveform data are compared and the number of feature points that match each other is greater than or equal to a predetermined value, the two pieces of operation waveform data may be judged as matching. Regarding the matching of two feature points as well, complete matching is not necessary, and if the time difference and acceleration difference between the two feature points fall within an allowable error range, the two feature points are judged as matching.

After the detection time is stored, the operation matching judgment unit 21 sequentially compares the detection information (operation waveform data) for each unit period received from the other apparatus 10 with the operation waveform data of the registered operation.

The operation matching judgment unit 21 judges whether or not the operation waveform data received from the other apparatus 10 in the period from the detection time to the time when the amount of time corresponding to the first threshold value α elapses matches the operation waveform data indicated by the identification information stored in association with the detection time. The method of judging matching here is the same as the above-mentioned method.

Although the operation waveform data registered in association with the identification information and the operation waveform data received from the other apparatus 10 are compared to judge whether or not they match, it is also possible to use a configuration in which the operation waveform data that was detected by the detection unit 1 of the apparatus at the time of detection and was judged as matching the registered operation waveform data is compared with the operation waveform data received from the other apparatus 10.

Based on the result of the judgment by the operation matching judgment unit 21, the command signal output determination unit 22 determines whether or not to output a command signal to the control unit 32 of the smartphone 30, which is an execution unit that executes a specific function when there is input of a command signal. The command signal is a command signal that specifies the above-described attack parameter.

If the command signal output determination unit 22 determines that a command signal is to be output, the output unit 23 outputs the command signal to the control unit 32 of the smartphone 30 via the communication unit 3.

The function of the control unit 2 above is realized in the case where an operation information measuring apparatus 10 is set as a hub. If an operation information measurement apparatus 10 is not set as a hub, the operation matching judgment unit 21, the command signal output determination unit 22, and the output unit 23 are removed from the control unit 2, and instead, a detection information transmission unit that periodically transmits the detection information detected by the detection unit 1 to the operation information measurement apparatus 10 that is the hub is formed by executing the apparatus program.

An operation of the system 100 constituted as described above will be described.

Figure 4:
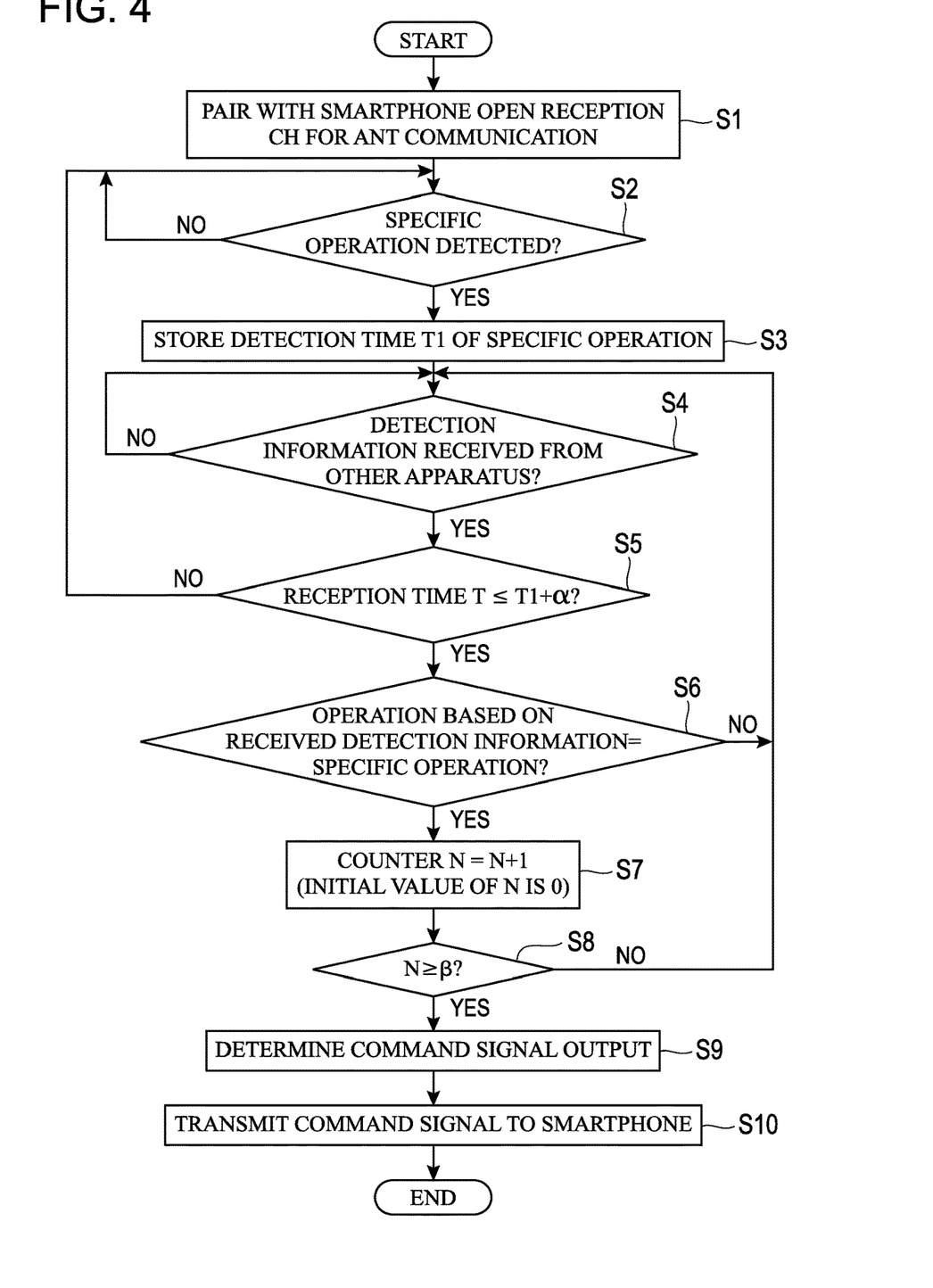
FIG. 4 is a flowchart for illustrating an operation of an operation information measurement apparatus 10 in the system 100.

FIG. 4 is a flowchart for illustrating an operation of the operation information measurement apparatus 10 in the system 100. Hereinafter, description will be given assuming that communication between the operation information measurement apparatus 10 that is the hub and the smartphone 30 is executed using Bluetooth communication, and communication between the operation information measurement apparatuses 10 is performed using ANT communication.

First, the user of a certain operation information measurement apparatus 10 puts the operation information measurement apparatus 10 on his or her wrist, and after executing the game program of the smartphone 30, operates the operation unit 4 to carry out pairing between an operation information measurement apparatus 10 and the smartphone 30.

Accordingly, communication between this certain operation information measurement apparatus 10 and the smartphone 30 is established, and this certain operation information measurement apparatus 10 is set as the hub. The control unit 2 of the operation information measurement apparatus 10 set as the hub opens a reception CH for ANT communication and transitions to a state of waiting to receive detection information from another apparatus 10 (step S1).

The control unit 2 of the operation information measurement apparatus 10 that is the hub compares the detection information for each unit period detected by the detection unit 1 with the detection information stored in the storage unit 5, and if they match each other, the control unit 2 detects that a registered operation (first operation) has been performed by the user (step S2: YES).

When the control unit 2 detects that a first operation has been performed, the detection time T1 thereof is stored in the storage unit 5 in association with the identification information of the first operation (step S3).

Next, upon receiving detection information from another apparatus 10 (step S4: YES), the control unit 2 compares the reception time T for the detection information with the detection time T1 for the first operation.

If the reception time T is past (detection time T1+α) (step S5: NO), the control unit 2 returns the processing to step S2, and if the reception time T is at or before (detection time T1+α) (step S5: YES), the control unit 2 performs the processing of step S6.

In step S6, the control unit 2 compares the received detection information and the detection information corresponding to the identification information of the first operation, and judges whether or not the operation (second operation) based on the received detection information snatches the first operation.

If the judgment of step S6 is NO, the control unit 2 returns the processing to step S4, and if the judgment of step S6 is YES, the control unit 2 updates the count value N (the initial value of N is 0) of a counter to (N+1) (step S7).

Thereafter, if the count value N is less than a second threshold value β (β is a natural number greater than or equal to 2) (step S8: NO), the control unit 2 returns the processing to step S4. If the count value N is a second threshold value β or more (step S8: YES), the control unit 2 determines that a command signal corresponding to the first operation is to be output to the smartphone 30 (step S9).

Note that the command signal need only be stored for each operation registered in advance in the storage unit 5. A command signal for increasing attack power in proportion to the count value N may be stored in the storage unit 5 for each registered operation.

Also, the control unit 2 generates a command signal corresponding to the first operation or the first operation and the count value N by acquiring it from the storage unit 5, and the control unit 2 transmits the generated command signal to the smartphone 30 via the communication unit 3 (step S10).

Upon receiving the command signal, the control unit 32 of the smartphone 30 performs setting of the attack parameter of the game in accordance with the received command signal and executes an attack based on the setting on the enemy character. In other words, the control unit 32 executes a specific function (attacking an enemy character) in accordance with a command signal.

As described above, according to the system 100, multiple users in possession of operation information measurement apparatuses 10 can execute an attack with a higher attack power on an enemy character in a game being executed by the smartphone 30 by performing substantially the same operation at substantially the same time.

If only one user performs the specific operation, the specific function of performing a strong attack will not be performed, and therefore it is possible to increase the number of ways to enjoy the game. Also, due to multiple users performing substantially the same operation at substantially the same time, a command signal is transmitted to the smartphone 30. For this reason, there is a low likelihood that the command signal will be transmitted to the smartphone 30 in error, and an operation corresponding to the object of the multiple users can be reliably performed on the smartphone 30.

The above-described first threshold value α need only be set as appropriate to a value of such a degree that it is possible to determine that multiple users have performed an operation at substantially the same time, with consideration given to the communication time lag between the operation information measurement apparatuses 10.

In the description above, the command signal was described as a signal for designating an attack parameter for a game, but there is no limitation to this. For example, if the smartphone 30 is locked, the operation information measurement apparatus 10 that is the hub may be configured to transmit a command signal for performing unlocking to the smartphone 30.

According to this configuration, the control unit 32 of the smartphone 30 performs unlocking in accordance with the command signal due to multiple users performing substantially the same operation at substantially the same time. For this reason, stronger security can be realized in comparison with the case of locking using a password.

In the description above, the system 100 includes multiple operation information measurement apparatuses 10 and a smartphone 30, but it is possible to use a system 100A in which the smartphone 30 is not included and in which two operation information measurement apparatuses 10 are included.

With the system 100A, in the initial setting, transmission and reception of the operation information measured by the operation information measurement apparatuses 10 is prohibited for communication performed by the two operation information measurement apparatuses 10 via the communication unit 3.

In the system 100A, the control unit 2 of the operation information measurement apparatus 10 executes an apparatus program, and thereby functions as an execution unit that executes a specific function (removing prohibition of transmission and reception of the above-described operation information) in accordance with the command signal output from the output unit 23. Also, the output unit 23 outputs the command signal to the execution unit in the case where output of the command signal is determined by the command signal output determination unit 22.

Figure 5:
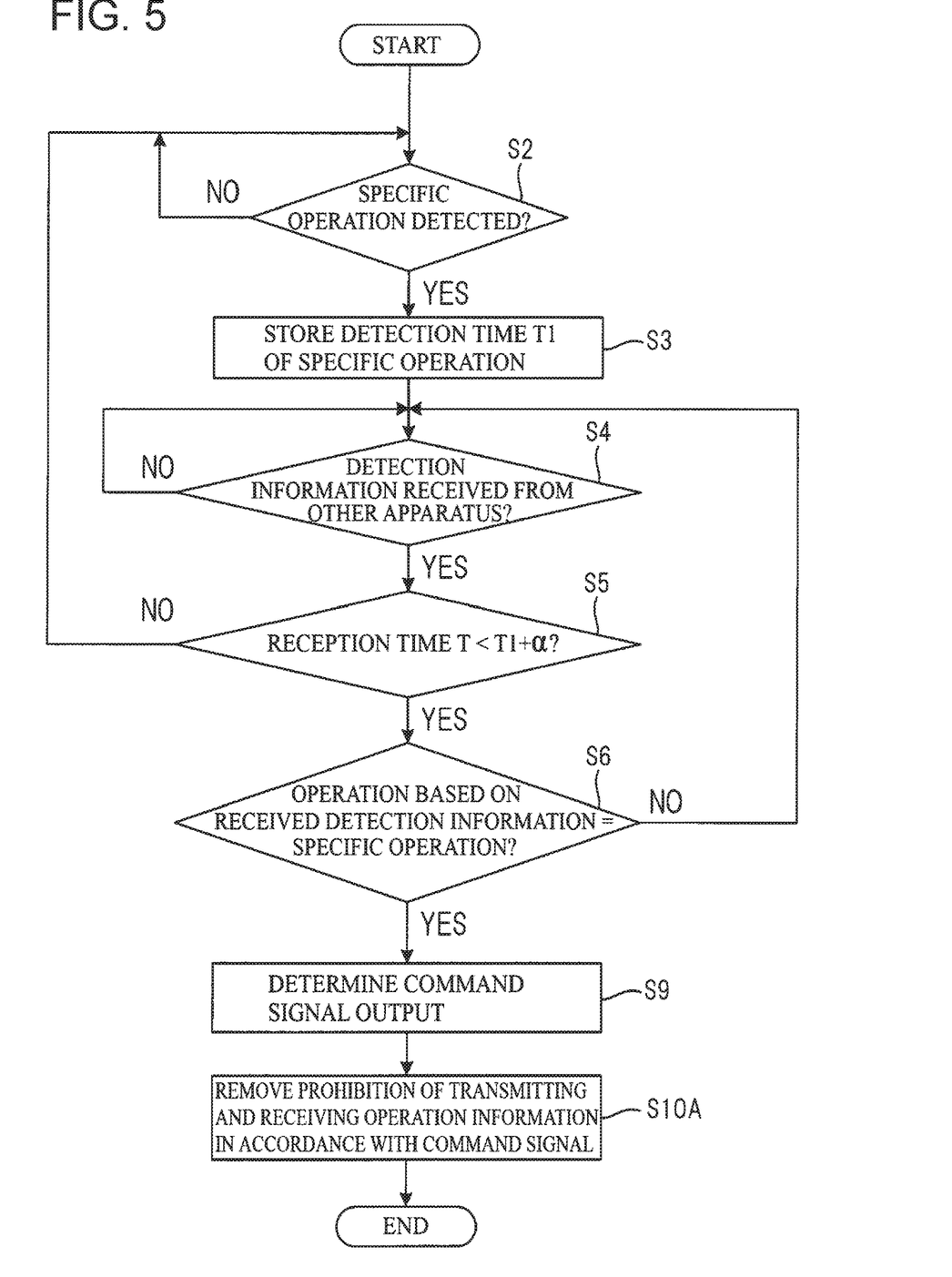
FIG. 5 is a flowchart for illustrating an operation of a system 100A, which is the system 100 without a smartphone 30.

FIG. 5 is a flowchart for illustrating an operation of the system 100A, which is the system 100 without the smartphone 30. In FIG. 5, processing that is the same as that in FIG. 4 is denoted by the same reference numerals thereas, and description thereof is not included.

In FIG. 5, upon approaching a distance at which the two operation information measurement apparatuses 10 can communicate using the communication units 3, the processing of steps S2 to S6 is performed by one of the operation information measurement apparatuses 10. Also, the processing of step S9 is performed when the judgment of step S6 is YES, the output unit 23 of one of the operation information measurement apparatuses 10 generates a command signal, and the output unit 23 outputs the command signal to the execution unit.

Upon receiving the command signal, the execution unit of one of the operation information measurement apparatuses 10 removes the restriction on communication with the other apparatus 10 (prohibition of transmission and reception of operation information), which is the transmission source of the detection information received in step S4 (step S10A).

Thus, with the system 100A, it is possible to start transmission and reception of the operation information between the two operation information measurement apparatuses 10 due to two users in possession of the operation information measurement apparatuses 10 performing substantially the same operation at the substantially the same time.

By exchanging the operation information between the operation information measurement apparatuses 10, for example, it is possible to determine compatibility between possessors of the operation information measurement apparatuses 10, and increase awareness of exercise by finding out the activity amount or the like of a partner.

A configuration is also conceivable in which the exchange of such operation information is started automatically when it becomes possible for the two operation information measurement apparatuses 10 to communicate, but with this configuration, there is a possibility that the operation information will be sent to an unintended partner.

With the system 100A, if users who wish to exchange operation information do not perform substantially the same operation at substantially the same time, the operation information will not be exchanged. For this reason, it is possible to prevent unintended outflow of information.

Also, with the system 100A, transmission and reception of the operation information is started by two users who wish to exchange operation information by shaking hands, performing a high-five, or the like, thereby making it possible to eliminate the need for an operation for starting transmission and reception of the operation information.

A program for causing a computer to function as the operation information measurement unit 20, the operation matching judgment unit 21, the command signal output determination unit 22, the output unit 23, and the execution unit of the operation information measurement apparatus 10, and a program for causing a computer to function as the control unit 32 can be provided by recording the programs on a computer-readable non-transitory recording medium.

Examples of such a "computer-readable recording medium" include optical mediums such as a CD-ROM (Compact Disc-ROM), and magnetic recording mediums such as a memory card. Also, such a program can be provided by downloading via a network.

The embodiments described above are to be understood as being in all ways exemplary and in no way limiting. The scope of the present invention is defined not by the above description, but by the scope of the appended claims, and all changes which come within the meaning and range of equivalency of the scope of the claims are intended to be included therein as well.

As described above, the present specification discloses the following items.

The disclosed operation information measurement apparatus is an operation information measurement apparatus having a detection unit configured to detect information corresponding to a motion of a user, including: an operation information measurement unit configured to measure operation information of a user based on the information detected by the detection unit; a communication unit for pertorrrsing near-field wireless communication with another operation information measurement apparatus having a said detection unit and a said operation information measurement unit; an operation matching judgment unit configured to judge whether or not a first operation based on detection information detected at a certain time by the detection unit of the operation information measurement apparatus matches a second operation based on detection information of the detection unit received from the other operation information measurement apparatus via the communication unit in a period from the certain time to a time when an amount of time corresponding to a first threshold value elapses; and a command signal output determination unit configured to, based on a result of the judgment performed by the operation matching judgment unit, determine whether or not a command signal is to be output to an execution unit configured to execute a specific function when the command signal is input.

The disclosed operation information measurement apparatus is such that among second operations based on the detection information received in the period from a plurality of said other operation information measurement apparatuses, if the number of second operations that match the first operation is greater than or equal to a second threshold value, the command signal output determination unit determines that the command signal is to be output.

The disclosed operation information measurement apparatus is such that the execution unit is included in an electronic device capable of communicating with the operation information measurement apparatus.

The disclosed operation information measurement apparatus is such that the operation matching judgment unit judges whether or not the first operation and the second operation match by comparing a feature point extracted from the detection information of the detection unit that indicates the first operation and a feature point extracted from the detection information of the detection unit that indicates the second operation.

The disclosed function control method is a function control method for an operation information measurement apparatus having a detection unit configured to detect information corresponding to a motion of a user, an operation information measurement unit configured to measure operation information of the user based on information detected by the detection unit, and a communication unit for performing near-field wireless communication with another operation information measurement apparatus having a said detection unit and a said operation information measurement unit, the method including: an operation matching judgment step of judging whether or not a first operation based on detection information detected at a certain time by the detection unit of the operation information measurement apparatus matches a second operation based on detection information of the detection unit received from the other operation information measurement apparatus via the communication unit in a period from the certain time to a time when an amount of time corresponding to a first threshold value elapses; and a command signal output determination step of, based on a result of the judgment performed in the operation matching judgment step, determining whether or not the command signal is to be output to an execution unit configured to execute a specific function when the command signal is input.

The disclosed program is a program for causing a computer to function as the operation information measurement unit, the operation matching judgment unit, and the command signal output determination unit in the operation information measurement apparatus.

The disclosed program is a program for causing a computer to function as the execution unit.

INDUSTRIAL APPLICABILITY

According to the present invention, it is possible to provide an operation information measurement apparatus, a function control method, and a program, according to which execution of a target specific function can be reliably controlled.

While the present invention has been described with reference to specific embodiments, the present invention is not limited to these embodiments, and many variations and modifications can be made without departing from the technical idea of the disclosed invention.

The present application claims the benefit of Japanese Patent Application 2014-175838 filed on Aug. 29, 2014, which is hereby incorporated herein in its entirety.

REFERENCE SIGNS LIST

10 Operation information measurement apparatus
1 Detection unit
2 Control unit
20 Operation information measurement unit
21 Operation matching judgment unit
22 Command signal output determination unit
23 Output unit
3 Communication unit
30 Smartphone (electronic device)
32 Control unit (execution unit)

The invention claimed is:

1. A system for controlling an execution unit comprising an execution processor for executing an electronic game, the system comprising:
  a first operation information measurement apparatus configured to be used while worn on a body of a first user, the first operation information measurement apparatus comprising:
    a first detection unit, comprising one or more sensors, configured to detect a motion of the first user;
    a first operation information measurement unit, implemented by a first processor, configured to measure a first operation of the first user based on the motion detected by the first detection unit;
    a first communication unit, comprising a first transceiver, for performing wireless communication with a second operation information measurement apparatus; and
  the second operation information measurement apparatus configured to be used while worn on a body of a second user, the second operation information measurement apparatus comprising:
    a second detection unit, comprising one or more sensors, configured to detect a motion of the second user;
    a second operation information measurement unit, implemented by a second processor, configured to measure a second operation of the second user based on the motion detected by the second detection unit;
    a second communication unit, comprising a second transceiver, for performing wireless communication with the first operation information measurement apparatus;
    an operation matching judgment unit, implemented by the second processor, configured to compare the first operation of the first user and the second operation of the second user, and judge whether or not the first operation and the second operation match; and
    a command signal output determination unit, implemented by the second processor, configured to, based on a result of the matching between the first operation and the second operation, send a command signal to the execution unit, wherein
  the operation matching judgment unit judges the match when the first operation and the second operation are the same operation and are performed at the same time.

2. The system according to claim 1, wherein the execution unit is included in an electronic device capable of communicating with the operation information measurement apparatus.

3. The system according to claim 1, wherein the operation matching judgment unit determines whether or not the first operation and the second operation match by comparing a first feature point extracted from first detection information of the first detection unit that indicates the first operation and a second feature point extracted from second detection information of the second detection unit that indicates the second operation.

4. A function control method in which a first operation information measurement apparatus, which has a first detection unit, comprising one or more sensors, configured to detect a motion of a first user, a first operation information measurement unit, implemented by a processor, configured to measure first operation information of the first user based on the motion detected by the first detection unit, and a communication unit, comprising a transceiver, for performing wireless communication with a second operation information measurement apparatus having a second detection unit, comprising one or more sensors, and a second operation information measurement unit, implemented by a second processor, wherein the first operation information measurement apparatus is worn on a body of the first user and a function of an electronic game is controlled, the method comprising:
  an operation matching judgment step of receiving information via the communication unit from the second operation information measurement apparatus worn on a body of a second user, comparing a first operation of the first user of the first operation information measurement apparatus and a second operation of the second user identified based on a motion detected by the second detection unit of the second operation information measurement apparatus, and judging whether or not the first operation and the second operation match such that the first operation and the second operation are the same operation and are performed at the same time; and
  a command signal output determination step of, based on a result of the matching between the first operation and the second operation, sending a command signal to an execution unit comprising an execution processor for executing an electronic game.

5. A non-transitory computer readable medium embodying a program that, when executed by a computer causes the computer to execute the method according to claim 4.

6. A non-transitory computer readable medium embodying a program that, when executed by a computer causes the computer to execute the function of the execution unit according to claim 1.

7. The system according to claim 2, wherein
the operation matching judgment unit determines whether or not the first operation and the second operation match by comparing a first feature point extracted from first detection information of the first detection unit that indicates the first operation and a second feature point extracted from second detection information of the second detection unit that indicates the second operation.

8. An operation information measurement apparatus configured to be used while worn on a body of a first user, comprising:
one or more sensors configured to detect a motion of the user;
a processor configured to:
measure first operation information of the first user based on the motion detected by the one or more sensors; and
a transceiver for performing wireless communication with a second operation information measurement apparatus to receive second operation information of a second user based on motion detected by the second operation information measurement apparatus of the second user, wherein
the processor is further configured to:
compare a first operation of the first user obtained from the first operation information with a second operation of the second user obtained from the second operation information, and judge whether or not the first operation and the second operation match;
determine a match occurs when the first operation and the second operation occur within a predetermined time difference; and
based on a result of the determined match, send a command signal to an electronic device for executing an electronic game.

9. The operation information measurement apparatus according to claim 1, wherein
the processor determines whether or not the first operation and the second operation match by comparing a first feature point extracted from the first operation information that indicates the first operation and a second feature point extracted from the second operation information that indicates the second operation.

* * * * *